United States Patent
Urakawa

(10) Patent No.: US 7,609,229 B2
(45) Date of Patent: Oct. 27, 2009

(54) IMAGE DISPLAYING APPARATUS

(75) Inventor: Takashi Urakawa, Kanagawa (JP)

(73) Assignee: Canon Kabushiki Kaisha (JP)

( * ) Notice: Subject to any disclaimer, the term of this patent is extended or adjusted under 35 U.S.C. 154(b) by 721 days.

(21) Appl. No.: 10/946,467

(22) Filed: Sep. 21, 2004

(65) Prior Publication Data

US 2005/0068255 A1 Mar. 31, 2005

(30) Foreign Application Priority Data

Sep. 30, 2003 (JP) ............................ 2003-340789

(51) Int. Cl.
*G09G 5/00* (2006.01)
(52) U.S. Cl. .................. 345/7; 345/8; 359/13; 359/360; 348/115
(58) Field of Classification Search ................. 345/7–9; 359/13, 206, 630, 599, 385, 662, 670–672; 348/53, 115; 351/200, 206, 211
See application file for complete search history.

(56) References Cited

U.S. PATENT DOCUMENTS

| | | | |
|---|---|---|---|
| 5,467,104 A | 11/1995 | Furness, III et al. | |
| 5,606,477 A | 2/1997 | Erpelding et al. | |
| 5,701,132 A * | 12/1997 | Kollin et al. ..................... | 345/8 |
| 5,757,544 A * | 5/1998 | Tabata et al. ................. | 359/434 |
| 6,204,829 B1 * | 3/2001 | Tidwell ......................... | 345/7 |
| 6,396,461 B1 * | 5/2002 | Lewis et al. .................... | 345/7 |
| 6,822,773 B2 | 11/2004 | Kabayashi | |
| 7,001,019 B2 * | 2/2006 | Takagi et al. ................. | 351/211 |
| 7,019,715 B1 | 3/2006 | Kasai et al. | |
| 7,190,497 B2 | 3/2007 | Kobayashi | |

FOREIGN PATENT DOCUMENTS

| | | |
|---|---|---|
| JP | 7-175005 | 7/1995 |
| JP | 8-334723 | 12/1996 |
| JP | 2000-258844 A | 9/2000 |
| JP | 2001-027738 A | 1/2001 |
| JP | 2003-084227 A | 3/2003 |

OTHER PUBLICATIONS

"Wafer Scale Packaging for MEMS Video Scanner", SPIE, Conference #4407 19 (Jun. 2001).
Japanese Office Action concerning Japanese patent application No. 2003-340789, which is foreign counterpart to instant application. (4 pages including office action and translation thereof are provided herewith).

* cited by examiner

*Primary Examiner*—Regina Liang
*Assistant Examiner*—Jennifer T Nguyen
(74) *Attorney, Agent, or Firm*—Rossi, Kimms & McDowell LLP

(57) ABSTRACT

A scanning image displaying apparatus capable of preferably adjusting a diopter is disclosed. The scanning image displaying apparatus includes a light source, a movable diffusing face, an imaging optical system for forming an image of the light source on the diffusing face, scanning means for two-dimensionally scanning the image of the light source formed by the imaging optical system on the diffusing face, an eyepiece optical system for guiding light from the diffusing face to an observer, and a mechanism for moving the light source and/or at least a portion of the imaging optical system in interlocking relationship with the movement of the diffusing face.

3 Claims, 5 Drawing Sheets

IMAGE DISPLAYING APPARATUS

BACKGROUND OF THE INVENTION

1. Field of the Invention

The present invention relates to a scanning image displaying apparatus for displaying an image by scanning light by optical scanning means, and particularly to a displaying apparatus suitably usable in a head mounted image display apparatus for displaying a predetermined image based on an image signal, and an electronic view finder system of a digital camera or the like.

2. Related Background Art

At the present days, as an image displaying apparatus such as a head mounted image display apparatus (a so-called HMD) and a digital camera, there exists an apparatus that uses a two-dimensional displaying element, i.e., a so-called flat panel, such as a transmission liquid crystal element, a reflection liquid crystal element, or an organic EL (electroluminescent) element. A variety of image displaying apparatuses have been proposed, in each of which the two-dimensional displaying element and an eyepiece optical system are combined such that a display image can be observed as a virtual image. In recent years, a higher-precision image is required in such image displaying apparatuses. Accordingly, a very large number of pixels must be provided on a flat panel display, and defects of pixels are likely to increase as the number of pixels increases. Further, the size of a pixel decreases relative to the size of a flat panel. Thus, problems of difficulty in manufacturing and the like occur.

On the other hand, a displaying apparatus using scanning means in place of a two-dimensional displaying element has been disclosed and proposed in U.S. Pat. No. 5,467,104. This U.S. Patent discloses techniques for scanning light of three colors, i.e., R(red), G(green) and B(blue), in both horizontal and vertical directions to form an image directly on a retina through an optical system.

As semiconductor process techniques advance as a method of fabricating scanning means for scanning a light beam, it becomes possible to obtain techniques for producing scanning means, which is high in speed while small in size and light in weight, by using techniques of a micro electro mechanical system (MEMS). Japanese Patent Application Laid-Open-No. H07-175005 (its title is "Planar type mirror galvanometer and method of manufacture", its applicant is The Nippon Signal Co., Ltd, and its U.S. counterparts is U.S. Pat. No. 5,606,447), and Japanese Patent Application Laid-Open No. H08-334723 (its title is "Optical deflecting device", and its applicant is Olympus Corporation) disclose and propose scanning means fabricated by using semiconductor process techniques. Likewise, MEMS of two-dimensional scanning means usable in an HMD is proposed by SPIE, Conference #4407 19(June 2001), "Wafer scale packaging for a MEMS video scanner", and a small-sized scanning image displaying apparatus can be achieved by using this scanning means.

Also in the scanning image displaying apparatus disclosed in the above-mentioned U.S. Pat. No. 5,467,104, light is required to scan at a very high speed, so that a very small device is used in a scanning portion, such as a mirror, for scanning light. In the event that such a small-sized scanning device is used, a scanned light beam becomes very thin, and hence the diameter of the light beam at the position of a retina of an observer becomes exceedingly small. Therefore, its exit pupil also becomes small, and it causes a problem that observation of an image is likely to be impossible when the positional relationship between an optical path and an eyeball varies.

As a method of giving an image to an observer in a scanning image displaying apparatus for solving the above-discussed problem, there exist techniques disclosed in U.S. Pat. Nos. 5,701,132 and 5,757,544. In an apparatus of U.S. Pat. No. 5,701,132, expanding means, such as a lens array and a diffuser, is disposed on an intermediate image plane, on which a scanned beam forms an image, light is transmitted through the expanding means, and a span angle of the light beam transmitted through the expanding means is enlarged.

Furthermore, adjustment of a diopter is required since there are a nearsighted person and a farsighted person among observers. In general, for purposes of adjusting the diopter using those image displaying devices, the diopter adjustment is carried out by varying the positional relationship between an image displaying device and an eyepiece optical system, or providing an eyepiece optical system for adjusting a diopter and moving this optical system.

In a method of adjusting a diopter, a movable optical system for correcting a diopter is provided, but in this case it is likely that the number of members increases and the size of an apparatus becomes large. Accordingly, in the event that a two-dimensional displaying device is used, a method that is adopted in which the device itself is moved to adjust a diopter comes in handy.

In a scanning image displaying apparatus, when a diopter is to be adjusted by moving a scanned surface (a surface to be scanned) which is equivalent to a two-dimensional displaying device, a problem that an image on the scanned surface is likely to blur occurs. A reason for a conjugate relationship between the light source and the scanned surface is broken if the scanned surface is moved.

SUMMARY OF THE INVENTION

It is an object of the present invention to solve the above-discussed problem, and to provide a scanning image displaying apparatus that is capable of preferably adjusting a diopter while the apparatus includes a scanned surface (a surface to be scanned).

An example of a scanning image displaying apparatus according to the present invention includes a light source, a movable diffusing face (a scanned surface), an imaging optical system for forming an image of the light source on the diffusing face, scanning means for two-dimensionally scanning the image of the light source formed by the imaging optical system on the diffusing face, an eyepiece optical system for guiding light from the diffusing face to an observer, and a mechanism for moving the light source and/or at least a portion of the imaging optical system in interlocking relationship with the movement of the diffusing face.

These and other objects, features and advantages of the present invention will become more apparent upon consideration of the following description of the preferred embodiments of the present invention taken in conjunction with the accompanying drawings.

DESCRIPTION OF THE PREFERRED EMBODIMENTS

Embodiments of scanning image displaying apparatuses according to the present invention will hereinafter be described with reference to the drawings.

First Embodiment

Figure 1:
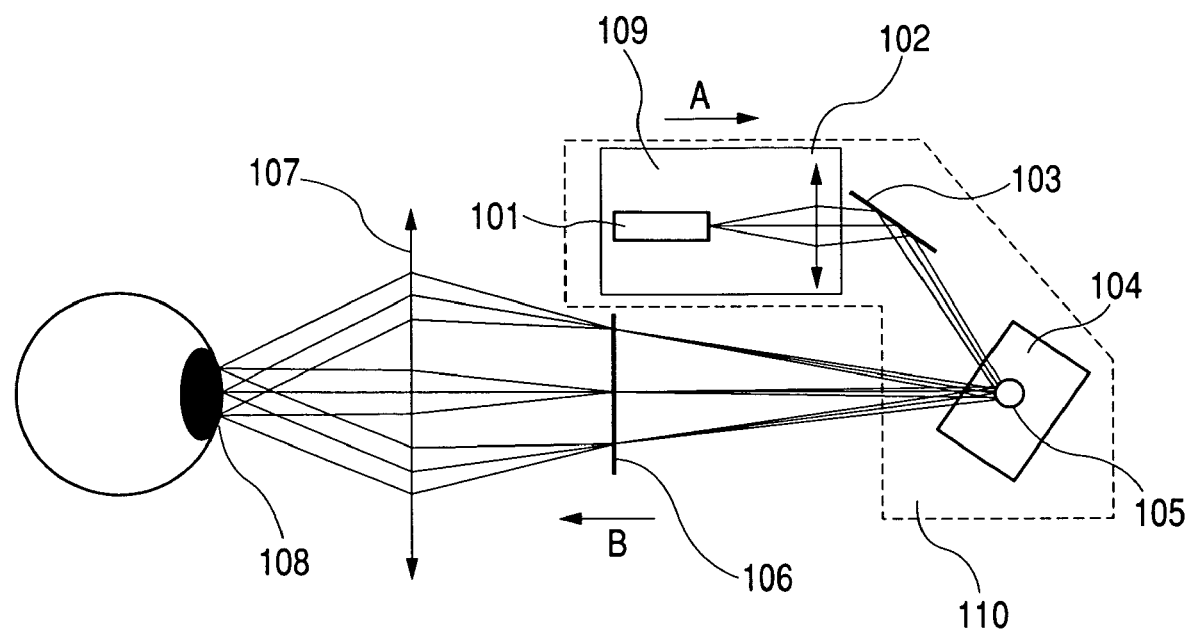
FIG. 1 is a view schematically illustrating an optical system in a scanning image displaying apparatus of a first embodiment according to the present invention.

An optical system in a scanning image displaying apparatus of a first embodiment according to the present invention will be described with reference to FIG. 1. FIG. 1 illustrates the structure of an optical system of a scanning image observing apparatus in which a transmission diffusing plate is arranged on a scanned surface 106. Such a scanning image observing apparatus is suitably usable in a head mounted display (HMD) for displaying a predetermined image based on an image signal, and an electronic view finder system of a digital camera or the like.

In FIG. 1, a light beam emitted from a light source 101 is modulated by a drive controlling circuit (not shown) based on an input signal of an image to be displayed. The light beam radiated from the light source 101 is transmitted through a light condensing optical system 102, and is then directed toward scanning means 104 through a folding optical system 103. There is provided in the scanning means 104 a scanning device with a reflecting facet produced by semiconductor process techniques. Light incident on a deflecting point 105 in the scanning device is two-dimensionally scanned on the scanned surface 106 when the reflecting facet of the scanning device is driven. An image of the light source 101 formed by the light condensing optical system 102 is formed on the scanned surface 106. In the scanning image displaying apparatus of the first embodiment, the image of the light source formed on the scanned surface 106 is scanned by synchronizing scanning characteristics of the scanning means 104 with the modulation of the light source 101 by a predetermined control means, and the image based on the image signal is accordingly displayed.

An optical system 107 is an eyepiece optical system for making it possible that an observer observes the scanned surface 106. A diffusing plate is disposed on the scanned surface 106. The diffusing plate diffuses the light beam incident thereon from the light source, and thus acts as a screen for giving to an observer an image formed by the scanned light beam. The observer discerns an image reproduced on the scanned surface 106 as a real image or a virtual image.

The light beam deflected by the scanning means 104 forms an image of the light source on the scanned surface 106. The scanned surface 106 is constructed as a transmission face having a diffusing function. Therefore, the light beam incident on the scanned surface 106 is diffused thereby, and is emitted through the optical system 107. The observer can observe the image formed on the scanned surface 106 by locating a retina of the observer near an exit pupil 108. In this structure, when the scanned surface 106 is accurately positioned at a location that is conjugate with the light source 101 with respect to the light condensing optical system 102, it is possible to present an image which is visually in focus to the observer.

It is, however, necessary to adjust a diopter since there are a nearsighted person and a farsighted person among observers. The adjustment of a diopter can be achieved by providing a movable auxiliary optical system, but in this case the size of the apparatus is liable to increase. As another method, there is a method of moving the scanned surface 106 relative to the eyepiece optical system 107. In a scanning displaying apparatus having such a structure as illustrated in FIG. 1, however, the reproduced image blurs, since a conjugate relationship (an imaging relationship) between the light source 101 and the scanned surface 106 with respect to the light condensing optical system 102 is broken.

To solve that problem, it is effective to move a light source unit 109 including the light source 101 and the condensing optical system 102 in a direction indicated by A, and at the same time move the position of the scanned surface 106 toward the eyepiece optical system 107 in a direction indicated by B, as illustrated in FIG. 1, such that the imaging relationship on the scanned surface 106 can be maintained. The direction B is parallel to a direction for changing an optical path length between the eyepiece optical system 107 and the scanned surface 106, and is parallel to an optical-axial direction of the eyepiece optical system 107, for example. Due to the movement in the direction B, it is possible to shorten the optical path length of the light beam diffused by the scanned surface 106 to the position of a pupil of an observer. Further, it is possible to increase the optical path length of the light beam diffused by the scanned surface 106 to the position of the pupil of the observer by moving the respective elements in reverse directions.

Thus, when the scanned surface 106 is moved to adjust the diopter, the light source unit 109 is moved in accordance with the amount of this movement while maintaining the imaging relationship. It is thereby possible to adjust the diopter of the observer while the reproduced image is preferably maintained.

Figure 2:
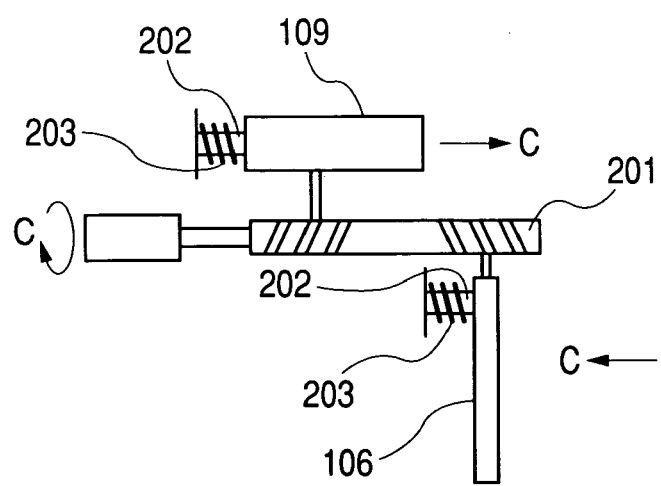
FIG. 2 is a view illustrating a mechanism for moving a light source unit and a scanned surface corresponding to each other in the scanning image displaying apparatus of the first embodiment.

FIG. 2 is a view illustrating a mechanism for moving the light source unit 109 and the scanned surface 106 corresponding to each other. When the light source unit 109 and the scanned surface 106 are disposed in an arranging manner illustrated in FIG. 1, these components move in reverse directions to each other. Therefore, reverse grooves are formed on an adjustment shaft 201 as illustrated in FIG. 2, and portions for fitting into these grooves on the adjustment shaft 201 are formed on the light source unit 109 and the scanned surface 106, respectively. Thus, when the adjustment shaft 201 is rotated, it is possible to move the light source unit 109 and the scanned surface 106 in interlocking relationship along those grooves on the adjustment shaft 201, respectively.

To stably maintain the moving directions of those components, shafts 202 are inserted into the light source unit 109 and the scanned surface 106 such that these components can be guided and smoothly slid without shakes along the shafts 202, respectively. When the adjustment shaft 201 is rotated in a direction C, the light source unit 109 and the scanned surface 106 can be simultaneously moved in directions C, respectively. When the adjustment shaft 201 is rotated in a reverse direction, the light source unit 109 and the scanned surface 106 are simultaneously moved in directions opposite to the above directions C, respectively.

The amounts of movements of the light source unit 109 and the scanned surface 106 can be regulated by changing pitches of the grooves formed on the adjustment shaft 201. The rotation direction of the adjustment shaft 201 and the movement directions of the light source unit 109 and the scanned surface 106 can be reversed, respectively.

To eliminate the shakes, springs 203 are provided to push the light source unit 109 and the scanned surface 106 toward a one-end direction of the adjustment shaft 201, as illustrated in FIG. 2. Thus, those components can be precisely moved. Alternately, the shaft 202 and a portion of the hole for fittingly receiving the shaft 202 can be formed with a robber or a resin having a large frictional resistance, such that each component cannot be slid unless an appropriate force is applied thereto.

Figure 3:
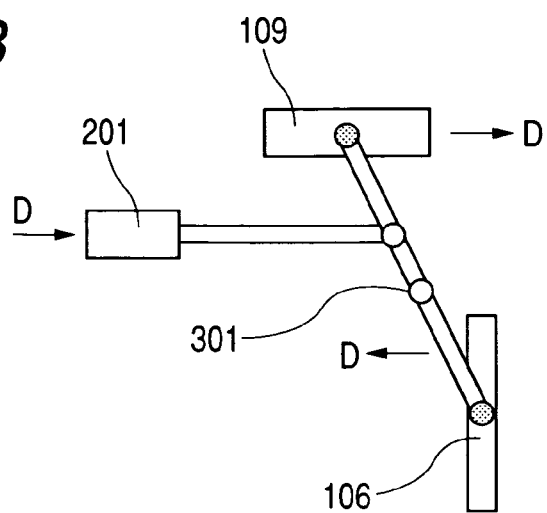
FIG. 3 is a view illustrating another mechanism for moving a light source unit and a scanned surface corresponding to each other in the scanning image displaying apparatus of the first embodiment.

FIG. 3 illustrates another method of moving the light source unit 109 and the scanned surface 106. In this method, the light source unit 109 and the scanned surface 106 are connected to opposite ends of a hinge member that can be rotated about a supporting point 301, and the structure is constructed such that when a location of the hinge member away from the supporting point 301 is pushed such that one end can be pushed downward, the other end can be lifted. When the adjustment shaft 201 is moved in a direction D, the light source unit 109 and the scanned surface 106 are moved in directions D, respectively. When the adjustment shaft 201 is moved in a reverse direction, the light source unit 109 and the scanned surface 106 are also moved in reverse directions, respectively.

Further, it is possible to use a member of a shaft capable of being fixed at a desired location and a ring for fittingly receiving the shaft, in place of the adjusting shaft 201. The adjustment can be carried out manually or in an electromotive manner. Such an adjustment mechanism can also serve as a position adjustment member capable of adjusting positions of the light source unit 109 and the scanned surface 106 at the time of assemblage. Accordingly, the number of components can be reduced, and the size of the system can be decreased.

In another method, only the light condensing optical system 102 is moved in place of the movement of the light source unit 109, and the light condensing optical system 102 is moved such that a conjugate positional relationship between the scanned surface 106 and the light source 101 moved for adjustment of a diopter can be maintained. It is thereby possible to change a distance of the light beam diffused by the scanned surface 106 to the position of an exit pupil of an observer without breaking the imaging relationship, and preferably adjust the diopter. When the light condensing optical system 102 is comprised of a plurality of optical members, it is possible to move only a portion of the light condensing optical system 102.

In still another method, a scanning unit 110 including portions from the light source 101 to the scanning means 104 is moved in interlocking relationship with the scanned surface 106, in place of the above-discussed light source unit 109. The same technical advantages can be likewise obtained by this method.

By using those methods, a diopter can be adjusted without additionally arranging a special movable optical system for adjustment a diopter.

Second Embodiment

Figure 4:
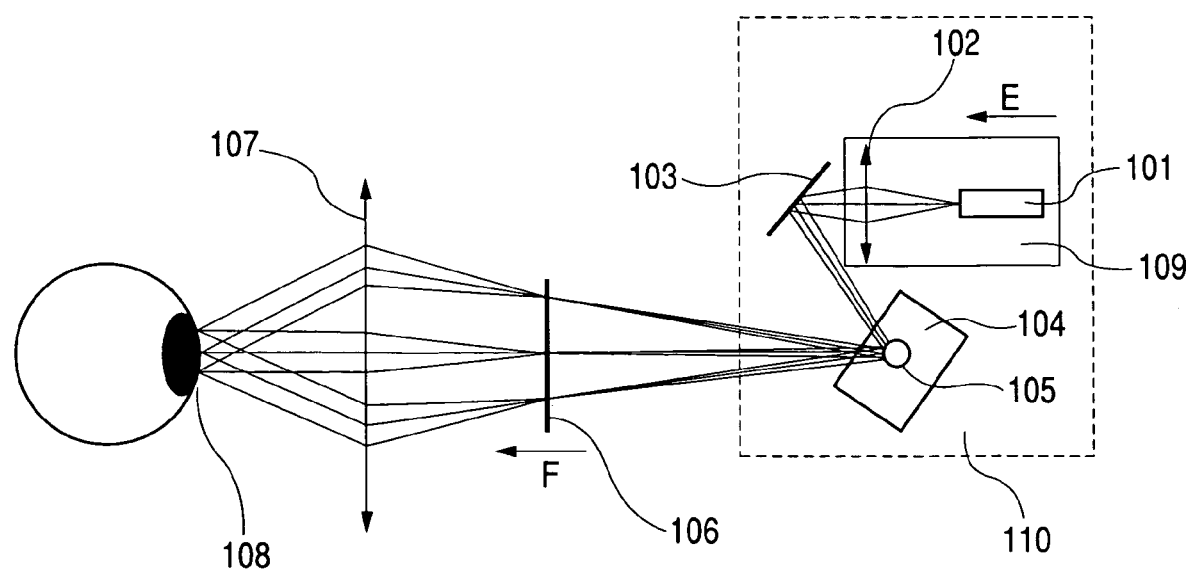
FIG. 4 is a view schematically illustrating an optical system in a scanning image displaying apparatus of a second embodiment according to the present invention.

An optical system in a scanning image displaying apparatus of a second embodiment according to the present invention will be described with reference to FIG. 4. FIG. 4 is a view schematically illustrating the optical system in the scanning image displaying apparatus of the second embodiment in which a transmission diffusing plate is disposed on a scanned surface 106, and components are arranged differently from the first embodiment. For the convenience of simplicity, components common to the first embodiment are designated by like reference numerals, and description will be made chiefly to portions different from the first embodiment.

Figure 5:
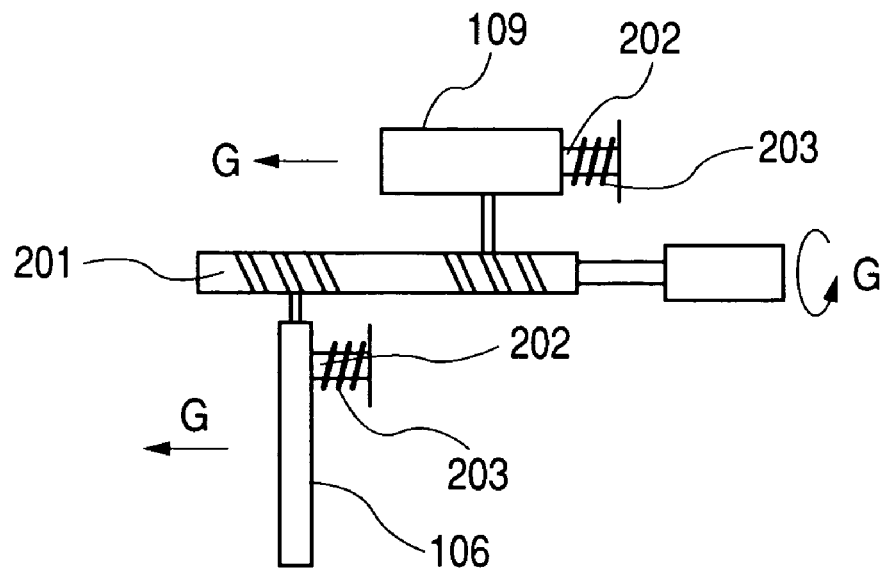
FIG. 5 is a view illustrating a mechanism for moving a light source unit and a scanned surface corresponding to each other in the scanning image displaying apparatus of the second embodiment.

FIG. 5 is a view illustrating a mechanism for moving the light source unit 109 and the scanned surface 106 corresponding to each other. When the light source unit 109 and the scanned surface 106 are disposed in an arranging manner illustrated in FIG. 4, these components move in the same direction at the time of adjustment of a diopter by the movement of the scanned surface 106. Therefore, grooves are formed on the adjustment shaft 201 as illustrated in FIG. 5, and the light source unit 109 and the scanned surface 106 are constructed on these grooves, respectively, such that they can be moved in interlocking relationship with each other.

Thus, when the adjustment shaft 201 is rotated in a direction G, it is possible to simultaneously move the light source unit 109 and the scanned surface 106 in directions G, respectively. When the adjustment shaft 201 is rotated in a reverse direction, the light source unit 109 and the scanned surface 106 are moved in directions opposite to the above-mentioned directions G, respectively. The rotation direction of the adjustment shaft 201 and the movement directions of the light source unit 169 and the scanned surface 106 can be reversed, respectively.

Figure 6:
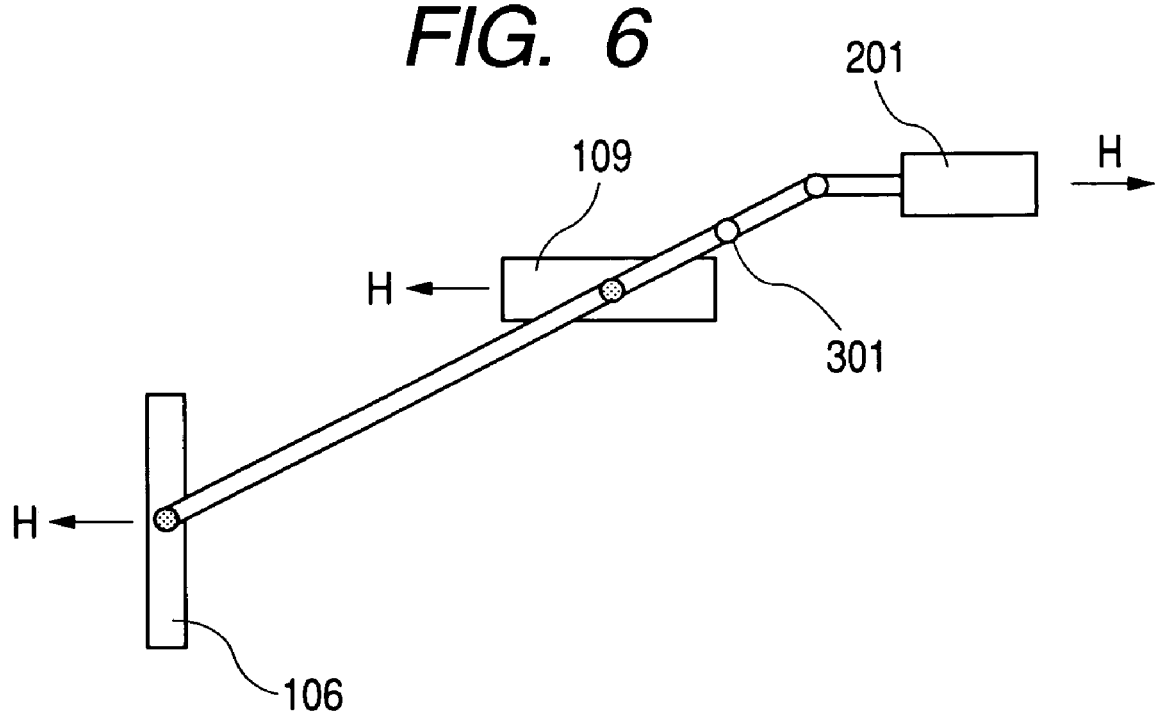
FIG. 6 is a view illustrating another mechanism for moving a light source unit and a scanned surface corresponding to each other in the scanning image displaying apparatus of the second embodiment.

FIG. 6 illustrates another method of moving the light source unit 109 and the scanned surface 106. In this method, the light source unit 109 and the scanned surface 106 are connected to a hinge member that can be rotated about a supporting point 301. As illustrated in FIG. 6, this structure is constructed such that when a location of the hinge member away from the supporting point 301 is moved, the light source unit 109 and the scanned surface 106 are moved in the same direction, respectively. When the adjustment shaft 201 is moved in a direction H, the light source unit 109 and the scanned surface 106 are moved in directions H, respectively. When the adjustment shaft 201 is moved in a reverse direction, the light source unit 109 and the scanned surface 106 are also moved in reverse directions, respectively.

Further, it is possible to use a member of a shaft capable of being fixed at a desired location and a ring for fittingly receiving the shaft, in place of the adjusting shaft 201. The adjustment can be carried out manually or automatically. Such an adjustment mechanism can also serve as a position adjustment member capable of adjusting positions of the light source unit 109 and the scanned surface 106 at the time of assemblage. Accordingly, the number of components can be reduced, and the size of the system can be decreased.

In another method, only the light condensing optical system 102 is moved in place of the movement of the light source unit 109, and the light condensing optical system 102 is moved such that a conjugate positional relationship between the scanned surface 106 and the light source 101, which are moved for adjustment of a diopter, can be established. It is thereby possible to change a distance of the light beam diffused by the scanned surface 106 to the position of an exit pupil of an observer without breaking the imaging relationship, and preferably adjust the diopter. When the light condensing optical system 102 is comprised of a plurality of optical members, it is possible to move only a portion of the light condensing optical system 102.

In still another method, a scanning unit 110 including components from the light source 101 to the scanning means 104 is moved in interlocking relationship with the scanned surface 106, in place of the above-discussed light source unit 109. The same technical advantages can be likewise obtained by this method.

By using those methods, a diopter can be adjusted without additionally arranging a special movable optical system for adjustment of a diopter.

Third Embodiment

Figure 7:
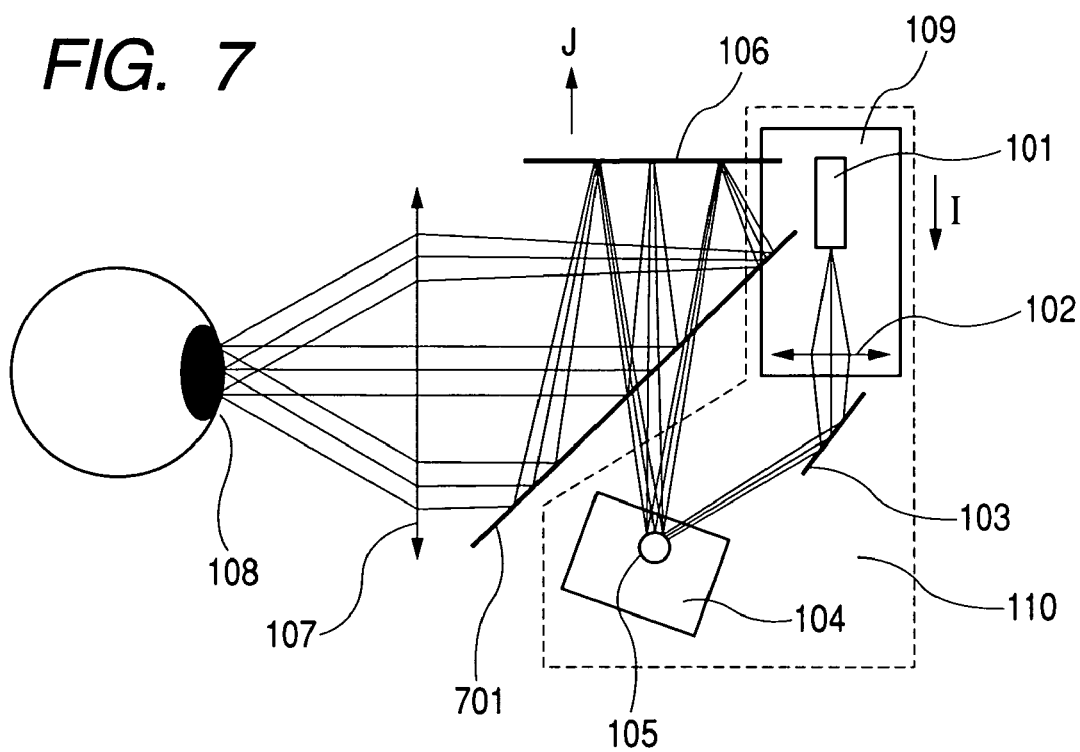
FIG. 7 is a view schematically illustrating an optical system in a scanning image displaying apparatus of a third embodiment according to the present invention.

An optical system in a scanning image observing apparatus of a third embodiment according to the present invention will be described with reference to FIG. 7. FIG. 7 illustrates the structure of the optical system of the scanning image observing apparatus in which a transmission diffusing plate is arranged on a scanned surface 106. The third embodiment is different from the first embodiment in that the scanned surface 106 is made a reflection type, and a half mirror 701 for separating a light beam incident on the reflection scanned surface 106 from a light beam reflected thereby.

In FIG. 7, a light beam emitted from a light source 101 is modulated by a drive controlling circuit (not shown) based on an input signal of an image to be displayed. The light beam radiated from the light source 101 is transmitted through the light condensing optical system 102, and is then directed toward the scanning means 104 through the folding optical system 103. There is provided in the scanning means 104 a scanning device produced by semiconductor process techniques. Light incident on a deflecting point 105 in the scanning device is deflected by the scanning device. The light beam deflected by the scanning means 104 is transmitted through the half mirror 701, and two-dimensionally scans the scanned surface 106.

In the scanning image observing apparatus of the third embodiment, an image of the light source is formed on the scanned surface 106, and an image based on the image signal is displayed thereon by synchronizing scanning characteristics of the scanning means 104 with the modulation of the light source 101.

The optical system 107 is an eyepiece optical system for making it possible that an observer observes the scanned surface 106. A diffusing plate is disposed on the scanned surface 106. Thus, the incident light beam from the light source 101 is diffused and scanned.

The light beam deflected by the scanning means 104 forms an image of the light source on the scanned surface 106. The scanned surface 106 is constructed as a reflection face having a diffusing function. Therefore, the light beam incident on the scanned surface 106 is reflectively diffused thereby, and the light beam reflectively deflected by the half mirror 701 is emitted through the optical system 107. An observer can observe an image formed on the scanned surface 106 by locating a retina of the observer near an exit pupil 108. In this structure, when the scanned surface 106 is accurately positioned at a location that is conjugate with the light source 101 with respect to the light condensing optical system 102, it is possible to present an image which is visually in focus to the observer.

To carry out a preferable adjustment of a diopter in the optical system illustrated in FIG. 7, it is effective to move the light source unit 109 including the light source 101 and the condensing optical system 102 in a direction indicated by I, and at the same time move the position of the scanned surface 106 in a direction indicated by J such that the imaging relationship on the scanned surface 106 can be maintained. This is because it is possible due to those movements to shorten the optical path length of the light beam diffused by the scanned surface 106 to the position of a pupil of an observer. Further, it is possible to increase the optical path length of the light beam diffused by the scanned surface 106 to the position of the pupil of the observer by moving the respective elements in reverse directions.

Thus, when the scanned surface 106 is moved to adjust a diopter, the light source unit 109 is moved in accordance with the amount of this movement. It is thereby possible to adjust the diopter of an observer while a reproduced image is preferably maintained.

When the light source unit 109 and the scanned surface 106 are disposed in an arranging manner as illustrated in FIG. 7, the components move in directions opposite to each other. It is therefore possible to adjust the diopter by moving the light source unit 109 and the scanned surface 106 in a manner as illustrated in FIG. 2 of the first embodiment. Such an adjustment mechanism can also serve as a position adjustment member capable of adjusting positions of the light source unit 109 and the scanned surface 106 at the time of assemblage. Accordingly, the number of components can be reduced, and the size of the system can be decreased.

In another method, only the light condensing optical system 102 is moved in place of the movement of the light source unit 109, and the light condensing optical system 102 is moved such that a conjugate positional relationship between the scanned surface 106 and the light source 101, which are moved for adjustment of a diopter, can be maintained. It is thereby possible to change a distance of the light beam diffused by the scanned surface 106 to the position of an exit pupil of an observer without breaking the imaging relationship, and preferably adjust the diopter. When the light condensing optical system 102 is comprised of a plurality of optical members, it is possible to move only a portion of the light condensing optical system 102.

In still another method, the scanning unit 110 including portions from the light source 101 to the scanning means 104 is moved in interlocking relationship with the scanned surface 106, in place of the above-discussed light source unit 109. The same technical advantages can be likewise obtained by this method.

By using those methods, a diopter can be adjusted without additionally arranging a special movable optical system for adjustment of a diopter.

Fourth Embodiment

Figure 8:
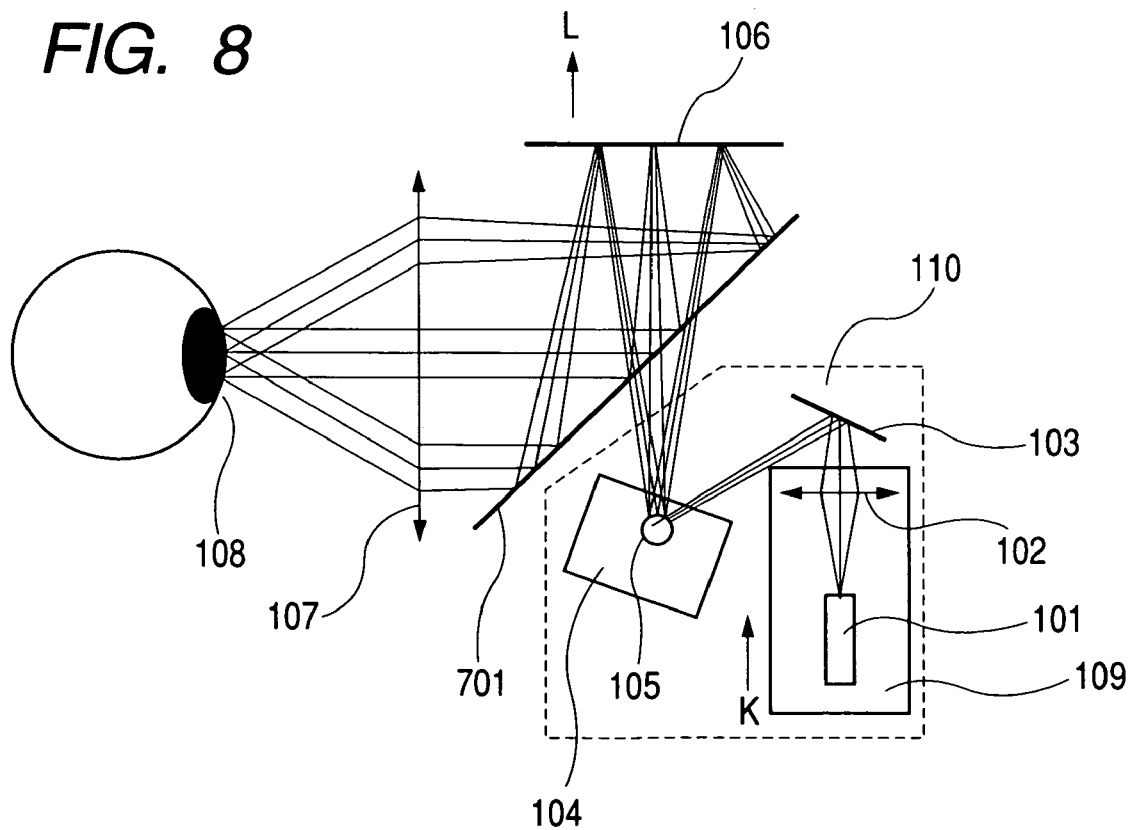
FIG. 8 is a view schematically illustrating an optical system in a scanning image displaying apparatus of a fourth embodiment according to the present invention.

An optical system in a scanning image displaying apparatus of a fourth embodiment according to the present invention will be described with reference to FIG. 8. FIG. 8 is a view schematically illustrating the optical system in the scanning image displaying apparatus of the fourth embodiment in which a reflection diffusing plate is disposed on a scanned surface 106, and components are arranged differently from the third embodiment. For the convenience of simplicity, components common to the third embodiment are designated by like reference numerals, and description will be made chiefly to portions different from the third embodiment.

When the light source unit 109 and the scanned surface 106 are disposed in an arranging manner as illustrated in FIG. 8, the components move in the same direction. It is therefore possible to adjust a diopter by moving the light source unit 109 and the scanned surface 106 in a manner as illustrated in FIG. 5 of the second embodiment. Such an adjustment mechanism can also serve as a position adjustment member capable of adjusting positions of the light source unit 109 and the scanned surface 106 at the time of assemblage. Accordingly, the number of components can be reduced, and the size of the system can be decreased.

By using the above-discussed methods, a diopter can be adjusted without additionally arranging a special movable optical system for adjustment of a diopter.

In each of the above-discussed embodiments, only the light condensing optical system 102 is disposed between the light source 101 and the scanned surface 106, so that the amounts of movements of the light source unit 109 and the scanned surface 106 are equal to each other. In cases where an optical system is interposed between the scanning means 104 and the scanned surface 106, the amount of movement of the scanned surface 106 is different from the amount of movement of the light source unit 109 since the amount of movement of the scanned surface 106 is an amount that is obtained by taking the magnification of that optical system into consideration.

Further, in each of the above-discussed embodiments, a light source for emitting monochromatic light can be used as the light source 101. Alternately, the following light source can be used, for example. Light sources for independently emitting light of red, green and blue are combined by color composition means, and radiation characteristics of the respective color light sources are independently controlled based on respective image signals. It is possible thereby that an observer can observe a color image.

Figure 9:
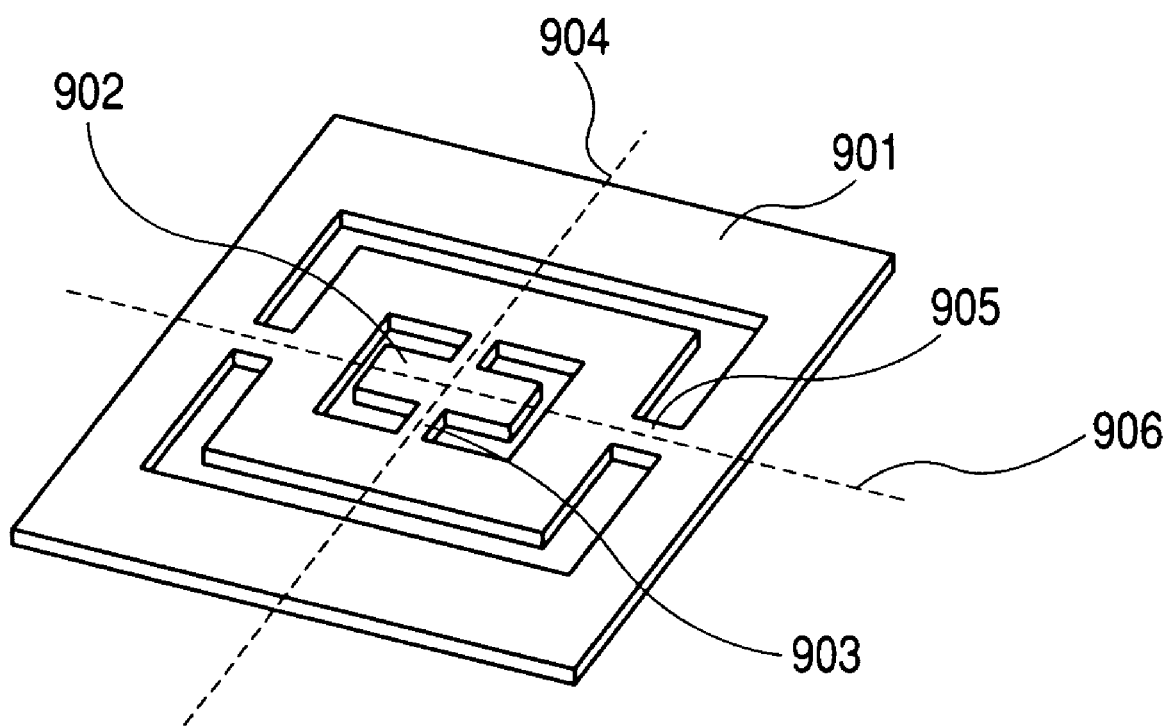
FIG. 9 is a view illustrating an example of scanning means used in the scanning image displaying apparatus of each embodiment.

Furthermore, in each of the above-discussed embodiments, scanning means having a structure illustrated in FIG. 9 can be used as the scanning means 104. FIG. 9 illustrates a scanning device 901 fabricated by semiconductor process techniques and provided in the scanning means 104. A scan surface 902 is resonantly rotated in a reciprocative manner approximately about an axis 904 of a torsional axis created by torsion bars 903. Further, the scan surface 902 is rotated in a reciprocative manner about an axis 906 created by torsion bars 905. As actuators for generating those two rotational motions, means (not shown) using electromagnetic force, electrostatic force or the like can be used, for example. The scanning device 901 is thus a device capable of two-dimensional scanning, and a raster scanning on the scanned surface 106 can be achieved by the scanning device 901.

While the invention has been described with reference to the structure disclosed herein, it is not confined to the details set forth and this application is intended to cover such modifications or changes as may come within the purposes of the improvements or the scope of the following claims.

This application claims priority from Japanese Patent Application No. 2003-340789 filed on Sep. 30, 2003, which is hereby incorporated by reference herein.

What is claimed is:

1. An image displaying apparatus comprising:
   a light source;
   a movable diffusing face configured to optically diffuse incident light from the light source;
   an imaging optical system forming an image of the light source on the diffusing face;
   a scanning unit configured to two-dimensionally scan the image of the light source on the diffusing face, said scanning unit being disposed between the light source and the diffusing face;
   an eyepiece optical system guiding light from the diffusing face to an observer; and
   a mechanism moving at least one of the light source and at least a portion of the imaging optical system in interlocking relationship with the movement of the diffusing face along an optical axis of the eyepiece optical system,
   wherein the mechanism moves said at least one of the light source and at least a portion of the imaging optical system such that a conjugate relationship between the light source and the diffusing face with respect to the imaging optical system can be maintained.

2. An image displaying apparatus according to claim 1, wherein the scanning unit includes a reflecting face reflecting light from the light source, and light from the light source is scanned by a rotational motion of the reflecting face.

3. An image displaying apparatus according to claim 1, wherein the imaging optical system includes at least one optical element common to the eyepiece optical system, and the common optical element has a reflection function and a transmission function to separate light incident on the diffusing face from light emerging from the diffusing face.

* * * * *